(12) United States Patent
Zhao

(10) Patent No.: US 11,868,674 B2
(45) Date of Patent: Jan. 9, 2024

(54) METHOD, APPARATUS AND SYSTEM FOR VIDEO SYNCHRONOUS DISPLAY

(71) Applicant: Huawei Technologies Co., Ltd., Shenzhen (CN)

(72) Inventor: Pingping Zhao, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 266 days.

(21) Appl. No.: 17/357,237

(22) Filed: Jun. 24, 2021

(65) Prior Publication Data

US 2021/0318844 A1 Oct. 14, 2021

Related U.S. Application Data

(63) Continuation of application No. PCT/CN2019/128118, filed on Dec. 25, 2019.

(30) Foreign Application Priority Data

Dec. 26, 2018 (CN) .......................... 201811601097.6

(51) Int. Cl.
| | |
|---|---|
| G06F 3/14 | (2006.01) |
| H04N 21/43 | (2011.01) |
| G06F 3/01 | (2006.01) |
| H04N 5/04 | (2006.01) |

(52) U.S. Cl.
CPC ............ G06F 3/1454 (2013.01); G06F 3/012 (2013.01); H04N 5/04 (2013.01); H04N 21/43076 (2020.08)

(58) Field of Classification Search
CPC ......... G06F 3/1454; G06F 3/012; H04N 5/04; H04N 21/43076; H04N 21/632; H04N 21/42201; H04N 21/43615; H04N 21/44218; H04N 21/6587; H04N 21/8455; H04N 21/4307; H04N 21/2387; H04N 21/25808; H04N 21/462; H04N 21/4781;

(Continued)

(56) References Cited

U.S. PATENT DOCUMENTS

| | | | |
|---|---|---|---|
| 2014/0282755 A1* | 9/2014 | Alsina | ............... H04N 21/4751 725/88 |
| 2015/0074700 A1 | 3/2015 | Danovitz | |
| 2015/0095512 A1 | 4/2015 | Ali et al. | |

(Continued)

FOREIGN PATENT DOCUMENTS

| | | |
|---|---|---|
| CN | 103209360 A | 7/2013 |
| CN | 105872723 A | 8/2016 |

(Continued)

*Primary Examiner* — Michael E Teitelbaum
(74) *Attorney, Agent, or Firm* — Conley Rose, P.C.

(57) ABSTRACT

A method performed by user equipment for video synchronous display includes playing a first video, receiving an indication of starting synchronous display with a target device, in response to the synchronous display indication, obtaining status information of the first video, where the video status information is used by the target device and the user equipment to synchronously play an image of the first video, and sending the video status information to the target device. The video status information may include video identification information and video playing progress information, or the video status information may include user posture data.

20 Claims, 8 Drawing Sheets

(58) Field of Classification Search
CPC ............ H04N 21/816; G02B 2027/014; G02B 27/0172; G02B 27/0179
See application file for complete search history.

(56) References Cited

U.S. PATENT DOCUMENTS

2016/0171220 A1* 6/2016 Yu ........................... G06F 21/60
 726/26
2016/0364198 A1 12/2016 Song et al.
2020/0310739 A1* 10/2020 Li ........................ H04N 21/632

FOREIGN PATENT DOCUMENTS

| CN | 106507184 A | 3/2017 |
| CN | 106550488 A | 3/2017 |
| CN | 107635152 A | 1/2018 |
| CN | 107770569 A | 3/2018 |
| CN | 107786881 A | 3/2018 |
| EP | 2978234 A1 | 1/2016 |
| WO | 2018207581 A1 | 11/2018 |

* cited by examiner

METHOD, APPARATUS AND SYSTEM FOR VIDEO SYNCHRONOUS DISPLAY

CROSS-REFERENCE TO RELATED APPLICATIONS

This is a continuation of International Patent Application No. PCT/CN2019/128118 filed on Dec. 25, 2019, which claims priority to Chinese Patent Application No. 201811601097.6 filed on Dec. 26, 2018. The disclosures of the aforementioned applications are hereby incorporated by reference in their entireties.

TECHNICAL FIELD

This application relates to the field of video technologies, and in particular, to a video synchronous display technology.

BACKGROUND

With rapid development of a multimedia technology and a network technology, digital video grows rapidly. A virtual reality (VR) technology is increasingly mature. The VR technology provides immersive experience for a user in a computer by comprehensively using a computer graphics system, various control means, and interface devices. The widespread use of the VR technology allows the VR technology to be increasingly popular with and experienced by ordinary consumers.

A VR-type device in the market is a virtual reality head-mounted display (HMD), which is referred to as a VR HMD or VR glasses, is a product integrating a plurality of technologies such as a simulation technology, a computer graphics man-machine interface technology, a multimedia technology, a sensing technology, and a network technology, and is a new man-machine interaction means by using the computer and the latest sensor technology.

The VR glasses and a target device share the same screen. A VR video image experienced by the user by using the VR glasses can be synchronously displayed on a display screen of the target device, so that the image seen by the user can be shared with others.

The VR device and the target device may be connected through a video connection cable, so that the image of the VR device is output on the target device. This is a screen-sharing solution used by most VR devices. In this solution, a video output port needs to be added on the VR device, and the video image is output to the target device in a wired manner. This manner requires a wired connection. Therefore, this solution cannot be used without a wire, increasing VR device hardware costs.

MIRACAST is a WI-FI CERTIFIED MIRACAST™ certification program announced by the WI-FI Alliance on Sep. 19, 2012. After the VR device and the target device are authenticated by MIRACAST, and when systems of the VR device and the target device support a MIRACAST function, screen mirroring between the VR device and the target device can be implemented according to this solution, to synchronously display the picture of the VR device on the target device in a wireless manner. This solution requires that the VR device and the screen-shared device be authenticated by MIRACAST. This needs to be supported by a system-level function of the device. Therefore, this solution has high limitations.

SUMMARY

This application provides a method, a device, and a system for video synchronous display, to implement video synchronous display through signaling, reduce a requirement on a transmission bandwidth between screen-sharing devices and implementation difficulty, and improve user experience.

According to a first aspect, a method for video synchronous display is provided. The method is applied to a user equipment side that plays screen-sharing video content. The method includes a user equipment plays a first video, the user equipment receives an indication of starting synchronous display with a target device, in response to the synchronous display indication, the user equipment obtains status information of the first video, where the video status information is used by the target device and the user equipment to synchronously play a picture of the first video, and the user equipment sends the video status information to the target device, so that the target device synchronously plays the picture of the first video based on the video status information.

In a possible design, the video status information includes video identification information and video playing progress information.

In a possible design, the video status information further includes user posture data. In this design, the user posture data can also be synchronously transmitted to the target device, to achieve a better virtual reality synchronization effect.

In a possible design, the user equipment performs suppression calculation on the user posture data, and sends the user posture data based on a suppression calculation result. This design can reduce the sent user posture data, save network traffic, and avoid impact caused by a slight action on posture data transmission.

In a possible design, the user equipment selects, based on a network connection manner between the user equipment and the target device, a near field manner or a far field manner to send the video status information to the target device, to more intelligently and flexibly transmit the video synchronization information.

In a possible design, the user equipment encapsulates the video status information and sends the encapsulated video status information to the target device. This ensures transmission of the synchronization information and compatibility.

In a possible design, the user equipment, when detecting that a video playing status changes, re-obtains the video status information of the first video and sends the video status information of the first video to the target device.

In a possible design, the user equipment, when detecting a playing progress synchronization instruction or a playing progress correction instruction, collects video playing progress information and video playing speed information, and sends the video playing progress information and the video playing speed information to the target device.

According to a second aspect, a method for video synchronous display is provided. The method is applied to a target device end for screen-sharing display, and the method includes a target device receives status information that is of a first video and that is sent by user equipment, where the status information of the first video is status information that is collected by the user equipment and that is of the first video being played on the user equipment, and the target device synchronously plays a picture of the first video based on the video status information.

In a possible design, the video status information includes video identification information and video playing progress information, and the target device finds a corresponding first video file based on the video identification information, and locates, based on the video playing progress information, a corresponding playing position.

In a possible design, the video status information further includes user posture data, and the target device restores, based on the user posture data, a playing picture that is of the first video and that is at the corresponding position.

In a possible design, the target device may further initiate a playing progress correction operation based on the received video playing progress information and a video playing speed information. For example, the target device determines whether there is a deviation between current playing progress and the received video playing progress of the user equipment. For example, the target device may determine whether the deviation is greater than a preset threshold (for example, 2 seconds). If the target device determines that the progress has a deviation, the target device corrects the progress of the currently played video, in other words, corrects the progress to the received video playing progress value of the user equipment, and the target device adjusts a playing speed to a received playing speed of the user equipment. Certainly, if the target device determines that the playing speed is the same as the playing speed of the user equipment, the target device may not need to adjust the playing speed. In this design, a periodic correction operation mechanism may be configured on the user equipment or the target device, to ensure accuracy of display synchronization between the user equipment and the target device.

According to a third aspect, user equipment for video synchronous display is provided. The user equipment includes a video playing module, a video status information obtaining module, and a video status information sending module. The video playing module is configured to play a first video. The video status information obtaining module is configured to obtain status information of the first video after receiving an indication of starting synchronous display with a target device, where the video status information is used for the target device and the user equipment to synchronously play a picture of the first video. The video status information sending module is configured to send the obtained video status information to the target device, so that the target device synchronously plays the picture of the first video based on the video status information.

According to a fourth aspect, a target device for video synchronous display is provided. The target device includes a video status information receiving module and a synchronous video playing module. The video status information receiving module is configured to receive status information that is of a first video and that is sent by user equipment. The status information of the first video is status information that is collected by the user equipment and that is of the first video being played on the user equipment. The synchronous video playing module is configured to synchronously play a picture of the first video on the target device based on the video status information.

According to a fifth aspect, an embodiment of this application provides a chip, including a processor and a memory. The memory is configured to store a computer-executable instruction, and the processor is connected to the memory. When the chip runs, the processor executes the computer-executable instruction stored in the memory, to enable the chip to perform any one of the foregoing methods for video synchronous display.

According to a sixth aspect, an embodiment of this application provides a computer storage medium. The computer storage medium stores an instruction, and when the instruction is run on a computer, the computer is enabled to perform any one of the foregoing methods for video synchronous display.

According to a seventh aspect, an embodiment of this application provides a computer program product. The computer program product includes an instruction, and when the instruction is run on a computer, the computer is enabled to perform any one of the foregoing methods for video synchronous display.

In addition, for technical effects brought by any design manner in the second to the seventh aspects, refer to technical effects brought by different design methods in the first aspect. Details are not described herein again.

This application further provides a system for video synchronous display, including the foregoing user equipment and the target device. These systems components implement the foregoing methods corresponding the foregoing aspects.

It may be understood that any one of the device, computer storage medium, computer program product, chip, or system for positioning a terminal that is provided above is configured to implement the corresponding method provided above. Therefore, for beneficial effects that can be achieved by the device, computer storage medium, computer program product, chip, or system for positioning the terminal, refer to the beneficial effects of the corresponding method. Details are not described herein again.

BRIEF DESCRIPTION OF DRAWINGS

To describe the technical solutions in the embodiments of this application more clearly, the following briefly describes the accompanying drawings for describing the embodiments.

DESCRIPTION OF EMBODIMENTS

To make the technical problems resolved, the technical solutions used, and the technical effects achieved in this application clearer, the following describes the technical solutions in this application with reference to the accompanying drawings in the embodiments. The detailed descriptions provide various embodiments of a device and/or a process by using block diagrams, flowcharts, and/or examples. These block diagrams, flowcharts, and/or examples include one or more functions and/or operations, so persons in the art may understand that each function and/or operation in the block diagrams, the flowcharts, and/or the examples may be performed independently and/or jointly by using much hardware, software, and firmware, and/or any combination thereof.

Figure 1:
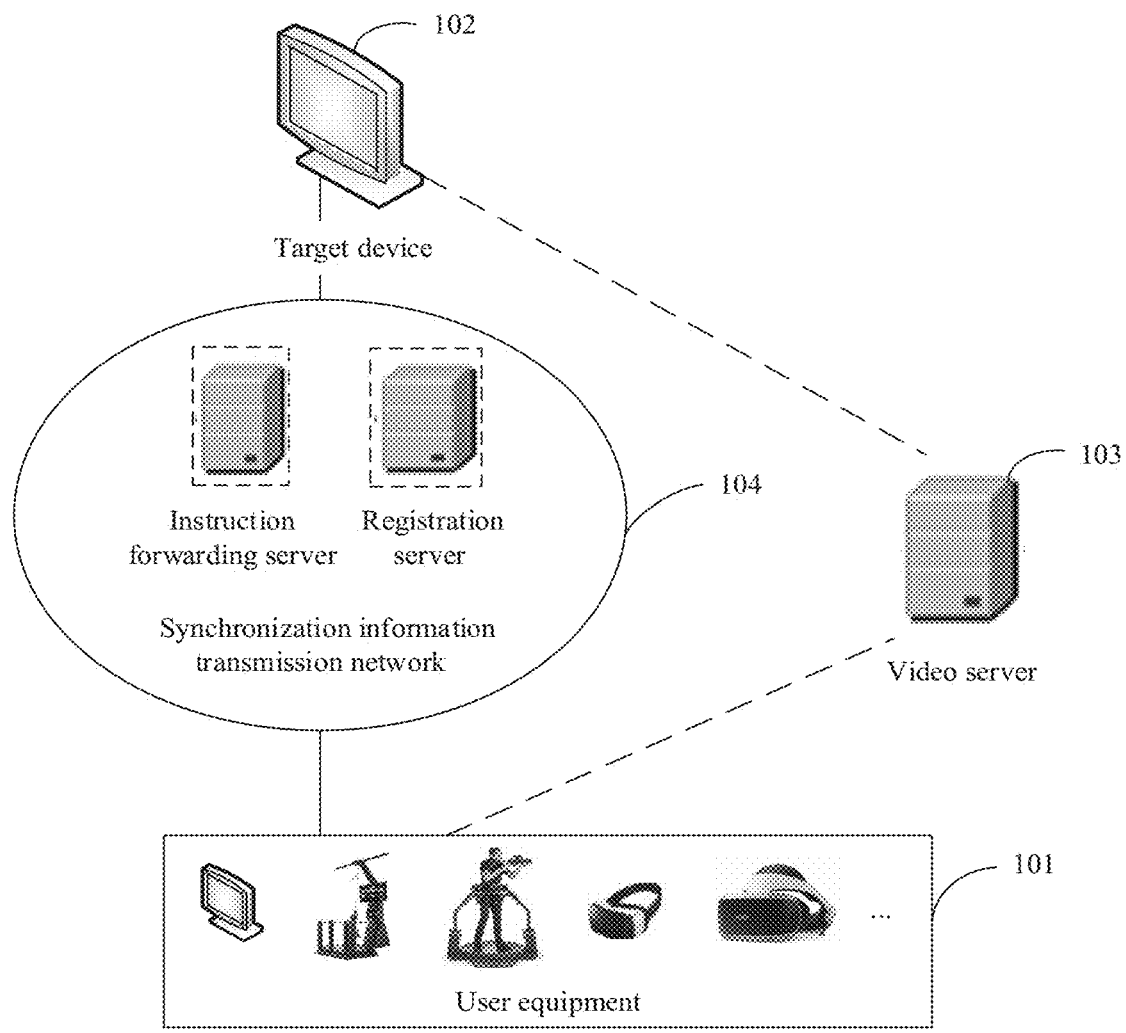
FIG. 1 is a schematic architectural diagram of a system for video synchronous display according to this application.

An embodiment of the present disclosure provides a schematic diagram of a system for video synchronous display. As shown in FIG. 1, the system includes user equipment 101, a target device 102, a video server 103 (optional), and a synchronization information transmission network 104. The user equipment 101 is connected to the target device 102 through the synchronization information transmission network 104. The synchronization information transmission network 104 may include a registration server (near field scenario) and an instruction forwarding server (far field scenario). The user equipment 101 and/or the target device 102 may store playable video content, or the user equipment 101 and/or the target device 102 may obtain video content from the video server 103 to play the video content. The following further describes a network entity in the embodiments of the present disclosure.

The user equipment 101 is a video playing device that has a video playing function and a network connection function. The user equipment 101 is a device that is currently being watched by a user and that can be operated. The user equipment 101 may play the video content stored by the user equipment 101, or may obtain the video content by connecting to the video server 103 and play the video content. The user equipment 101 may collect status information of a video currently played by the user equipment 101, and send the status information to the target device 102. The video status information is information according to which the target device 102 can synchronously play a same video picture as the current user equipment 101, for example, the video status information is identification information of the video content and video playing progress information, and may further include user posture data (for example, HMD posture data) and other video attributes. The user equipment 101 may further determine a network relationship with the target device 102, and select a proper network path to transmit the video status information. The user equipment 101 may be a VR device, for example, an HMD. An optical signal or even a binocular stereoscopic visual signal is sent to eyes by using various HMDs, to implement a virtual reality effect.

The target device 102 is a device to which a screen is shared (or video synchronous display), receives, through the synchronization information transmission network 104, the video status information sent by the user equipment 101, finds corresponding video content based on the video status information to restore the video image. There may be one or more target devices 102, and the plurality of target devices 102 may synchronously display, based on the same video status information, the image that is the same as that of the user equipment 101.

The video server 103 provides a video service for the user equipment 101 and/or the target device 102, and provides video content or a video playing service based on a video ID or address requested by the user equipment 101 or the target device 102.

The synchronous information transmission network 104 is a network path for the user equipment 101 to transmit media status information to the target device 102.

In the near field scenario (located in a same network segment), the registration server provides a registration mechanism for the user equipment 101 and the target device 102 to carry out a video synchronous service, so that the user equipment can discover the target device that performs screen-shared display, to establish a connection between the user equipment 101 and the target device 102, and to implement a screen-sharing function. In this case, the user equipment 101 and the target device 102 directly transmit media status information data through the synchronization information transmission network 104. Internal network-based communication methods include but are not limited to Digital Living Network Alliance (DLNA), WEB SERVICE, JavaSocket, and WEBSOCKETS.

In the far field scenario, the user equipment may forward the media status information to the target device by using the instruction forwarding server. Deployment manners of the instruction forwarding server include but is not limited to protocol-based manners such as instant messaging (IM) server, Extensible Messaging and Presence Protocol (XMPP) server, socket server or web service.

The system for video synchronous display provided in the embodiment of the present disclosure does not need to implement screen-sharing display between the user equipment and the target device by mirroring the video content, in other words, the user equipment does not need to transmit image information of the video image being played to the target device. This reduces a data bandwidth requirement between the user equipment and the target device in a screen-sharing process. Because the user equipment and the target device can implement screen-sharing display as long as the user equipment and the target device have a network communication function, no additional hardware cost is required. Therefore, the user equipment and the target device have very good device compatibility. In addition, for the user equipment that can play the VR video content, because there is no image mirroring relationship between the user equipment and the screen-shared device in the system in this embodiment of the present disclosure, the user equipment (for example, VR glasses) may provide, based on a device capability of the user equipment, a VR effect of binocular output for a user who uses the user equipment, and may implement normal monocular output on the target device, so that a user who watches the target device can have better experience.

Figure 2A:
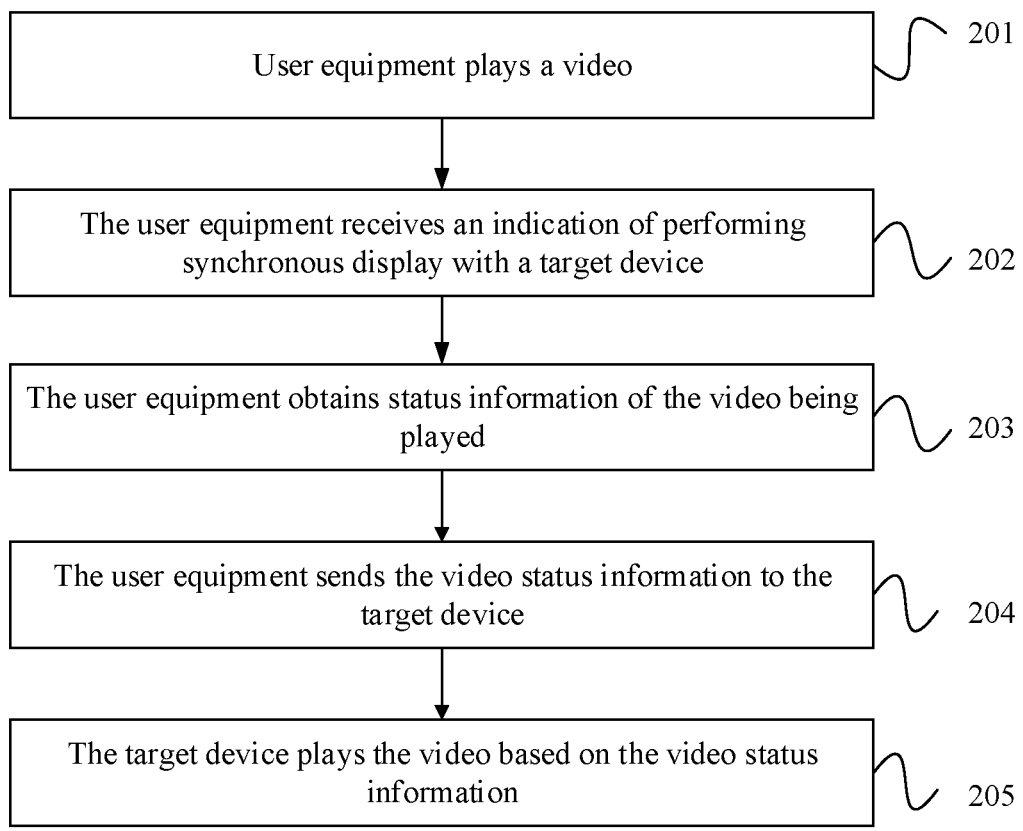
FIG. 2A is a flowchart of an embodiment of initiating, by user equipment, video synchronous display according to this application.

FIG. 2A is a flowchart of an embodiment in which user equipment initiates video synchronization display with a target device based on the system shown in FIG. 1.

S201: User equipment plays a video.

That the user equipment plays the video may be that the user equipment plays video content, for example, the user equipment opens various video files. Alternatively, a user starts to play a game and enters a game image, in other words, the user equipment plays a game video rendered in real time. The video image may be generated or changed based on an action of the user (a game player).

The video content played by the user equipment may be video content stored in the user equipment, or may be a video obtained from a video server (or a game server) and played. For example, the video server is a streaming server.

S202: The user equipment receives an indication of performing synchronous display with the target device.

The indication of performing synchronous display may be generated through an operation performed by the user on the user equipment (namely, a video playing device). For example, screen-sharing display with the target device is triggered by a click by the user in a video playing interface or a VR application interface. Alternatively, the indication may be sent by the target device to the user equipment to request to perform synchronous display with the user equipment, or may be a default configuration of the user equipment.

S203: In response to the indication of synchronous display, the user equipment obtains status information of the video being played, namely, video status information.

After determining that synchronous display (screen-sharing display) needs to be performed with the target device, the user equipment collects the video status information of the video being played. The video status information is information that may be sent to the target device and according to which the target device may synchronously play the video image that is the same as that of the current user equipment, but does not include the video image or the video content (for example, encoding and decoding data of the video image).

If the video display image currently played by the user equipment is irrelevant to a posture, an action, or a viewing angle of the user (in other words, the current posture, the action, the viewing angle, a moving speed, or the like of the user does not affect the video content currently displayed), the video status information includes identifier information of the video content and video playing progress information. The identification information of the video content is used to enable the target device to find the same video file, and the video playing progress information is used to enable the target device to position playing progress of the video file to the same playing position as that of the user equipment, to ensure that the user equipment and the target device present the same video image (including the beginning of the video) to the outside. Further, if playing speeds of the video by the user equipment and the target device are inconsistent or may be inconsistent, the video status information further includes playing speed information of the video. Further, the video status information may include a media identifier (ID) of the video being played, a name of the video, an address of the video being played, a position of a time point of the video being played, a playing speed of the video, luminance, a resolution, volume, subtitle information, and a specific parameter type of the video status information. A quantity or the name may also have other representation forms, and is not limited in the embodiment of the present disclosure.

Further, if the video content or image played by the user equipment may be affected by the current posture, the action, or the viewing angle of the user, for example, if different video content or images played by the VR glasses may be present based on different viewing angles of the head of the user (which may generally correspond to HMD posture data of the user), the status information of the video being played may further include current posture information of the user, for example, the HMD posture data of the user.

The user equipment may collect the video status information only once when initiating synchronization. This can save processing resources and network bandwidths because many default configurations of the user equipment and the target device are the same, for example, default video playing speeds are the same. Alternatively, after initiating synchronization, the user equipment periodically collects the video status information until the screen is not shared. Alternatively, when initiating synchronization, the user equipment collects all video status information, and subsequently collects only a portion of specific video status information, for example, when initiating synchronization, the user equipment collects all video status information and sends all the video status information to the target device, and subsequently periodically collects and sends only user posture information or playing progress information. The user equipment may collect the current posture information of the user when each frame of the video is rendered, or may collect the current posture information of the user in another period which is set as required.

S204: The user equipment sends the video status information to the target device.

The user equipment and the target device may be located in a subnet in a same IP gateway, namely, in a same network segment (or a near field scenario). In the near field scenario, the user equipment directly transmits the video status information to the target device through an internal network. Communication protocols used for internal network-based communication include but are not limited to DLNA, WEB SERVICE, JavaSocket, and WEB SOCKETS.

The user equipment and the target device may be located in different network segments or even different networks (which may be referred to as a far field scenario). In the far field scenario, the user equipment may forward the video status information to the target device by using a forwarding server. Deployment manners of the forwarding server include but are not limited to IM server, XMPP server, socket server and web service.

After obtaining the video status information, the user equipment may select, based on the target device, pre-registered information, or a selection of the user, a manner of sending the video status information to the target device. For example, in the near field scenario, the user equipment directly sends an instruction to the target device through an internal network, or in the far field scenario, the user equipment forwards an instruction to the target device by using the forwarding server.

The user equipment may collect and send the video status information at the same time, in other words, after collecting the video status information, the user equipment sends the collected video status information immediately or as soon as possible. Alternatively, a sending period may be configured based on a network condition. For example, when the video status information is collected every one millisecond, the sending period of the video status information is adjusted to 10 milliseconds if the network condition is poor, in other words, the latest collected video status information is sent every 10 milliseconds, and then the video status information may be updated every millisecond if the network transmission condition is improved or the network is switched to a better network.

Similarly, the target device may also flexibly configure or adjust a receiving period and a processing period of the video status information based on the network condition or a device capability of the target device. Details are not described herein in this embodiment. This flexible configuration can ensure a synchronization effect and reduce an amount of data transmitted on the network.

When the user equipment collects the user posture information, to ensure smooth network data transmission between the user equipment and the target device, the user equipment may perform suppression calculation before sending the collected posture data. A calculation method may be calculating a three-dimensional spatial included angle formed by postures of the user at two consecutive time points, and only when the included angle is greater than a threshold, the user posture data (for example, HMD posture data) is sent to the target device. This avoids impact caused by a slight change in a user posture on data, to achieve a balance between performance and an effect.

For example, an HMD posture synchronization suppression algorithm may be used for processing the HMD posture data.

The calculation method includes obtaining two pieces of continuous posture data (x1, y1, z1, w1) and (x2, y2, z2, w2) that are detected by an HMD sensor and that describe current watching directions of the user, and calculating a three-dimensional spatial included angle between the two pieces of posture data. A method for calculating the spatial included angle is as follows:

$$\theta = \arccos\left(\frac{x_1 x_2 + y_1 y_2 + z_1 z_2 + w_1 w_2}{\sqrt{x_1^2 + y_1^2 + z_1^2 + w_1^2} + \sqrt{x_2^2 + y_2^2 + z_2^2 + w_2^2}}\right).$$

If the spatial included angle is less than the threshold, the HMD posture data is suppressed according to a viewing angle calculation formula, and the HMD posture data does not need to be sent. The HMD posture data is sent to the target device only when the included angle is greater than the threshold.

The user equipment may further encapsulate the obtained video status information and then send the encapsulated video status information, to facilitate network transmission or receiving or parsing of the target device. The user equipment may add an indication or identification information to the encapsulated information, to indicate the target device to perform a screen-sharing operation based on the video status information. Certainly, the target device may also be configured to detect a portion of video status information, and initiate the screen-sharing operation. In this case, the indication or the identification information is unnecessary. For a specific encapsulation form, refer to descriptions in the following embodiments.

S205: The target device plays the video based on the video status information.

Further, the target device may perform the following actions.

(Optional) The target device checks validity of the received video status information. For example, synchronous display is allowed only after the target device determines that the user equipment or the video content is valid. The target device may perform processing based on a portion or all of the video status information and a setting.

The target device requests a corresponding video server (for example, a content delivery network (CDN) server) to obtain corresponding video content based on an identifier (or an address) of the video. Alternatively, the target device finds, based on the identifier or address of the video, the corresponding video content in the video content stored by the target device.

The target device restores the playing progress of the video based on the playing progress information in the video status information.

The target device restores the playing speed of the video based on the playing speed information in the video status information (Optional, for example, the user equipment and the target device may play the video at a default speed).

Optionally, the target device may further restore a playing picture or a playing status of the video on the user equipment based on other information in the video status information, for example, parameters such as the luminance, the resolution, the volume, and the subtitle information.

Figure 2B:
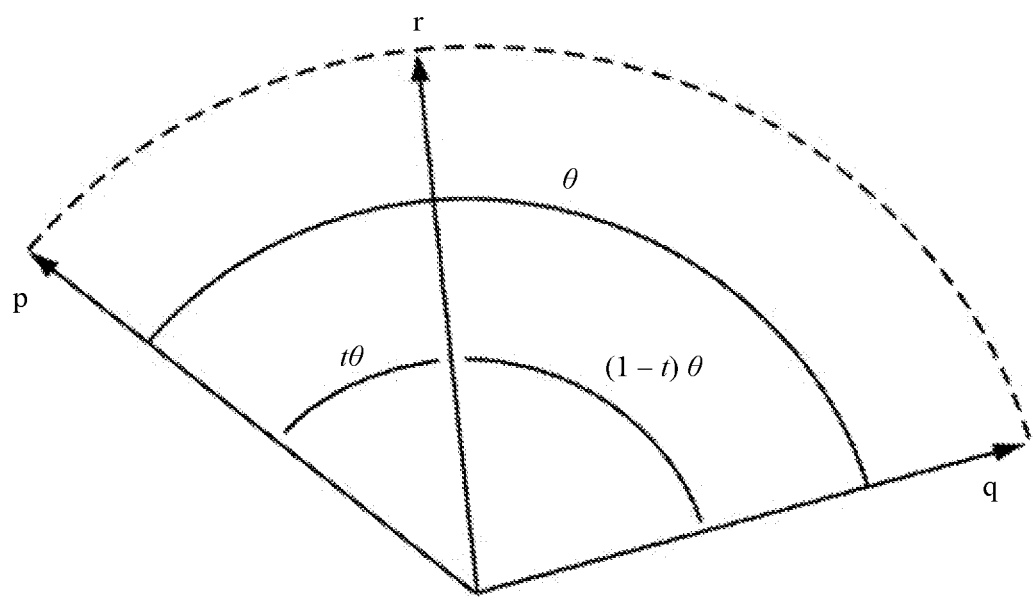
FIG. 2B is a schematic diagram of calculating a head-turning action of a user according to a spherical linear direction formula according to this application.

Further, if the video status information further includes the current posture information of the user, the target device further restores the played video based on the posture information. For example, after receiving the HMD sensor posture data, the target device renders a corresponding video picture based on the posture data, to restore the video picture watched by the user on the user equipment (such as the VR glasses). A specific restoration manner may be performing interpolation calculation on the posture data, to calculate an intermediate status and restore a head-turning action of the user. The HMD posture data is used as an example. After receiving the HMD sensor posture data, a screen-shared device renders the video picture based on the posture data, to restore the video picture watched by the user on the user equipment. In this embodiment of the present disclosure, to more vividly restore the head-turning action of the user watching the picture, a spherical linear interpolation method is used between two pieces of continuous sensor data, to restore the head-turning action of the user. As shown in FIG. 2B, if the two pieces of adjacent quaternion data generated by the head-turning action of the user are P (x1, y1, z1, w1), and q (x2, y2, z2, w2), the target device obtains an intermediate point t, and restores a posture of the user based on a value of the intermediate point t. A formula of a spherical linear direction is as follows:

$$Slerp(p, q, t) = \frac{\sin[(1-t)\theta]p + \sin t\theta q}{\sin\theta}.$$

The spatial direction of the time point t is p(t)=Slerp(p, q, t). Note: slerp represents spherical linear interpolation.

In the method for video synchronous display according to the embodiment of the present disclosure, screen-sharing display does not need to be implemented in a mirroring manner, in other words, information of the video picture being played does not need to be transmitted to the target device. This reduces a data bandwidth requirement in a screen-sharing process. As long as the user equipment and the target device have the network communication function, a screen can be shared, and no additional hardware cost is required. Therefore, the user equipment and the target device have very good device compatibility. In addition, for the user equipment that can play the VR video content, because there is no picture mirroring relationship between the user equipment and the screen-shared device in the method in this embodiment of the present disclosure, the user equipment (for example, the VR glasses) may provide, based on a device capability of the user equipment, a VR effect of binocular output for a user who uses the user equipment, and may implement normal monocular output on the target device, so that a user who watches the target device can have better experience. In this embodiment of the present disclosure, the user posture data is further processed according to the suppression algorithm, to avoid impact caused by a slight change in a user posture on data transmission, and to achieve a balance between performance and the effect.

To enable the user equipment to discover the target device that performs screen-sharing display, and to establish a connection between the user equipment and the target device and implement a screen-sharing function, the following manner may be used for implementation.

In an implementation, target device information, for example, an Internet Protocol (IP) address of the target device, is pre-configured on the user equipment, and the target device is also configured to accept a screen-sharing request of a specific user equipment and complete the screen-sharing display function based on an instruction of the specific user equipment. In this way, after the user equipment and the target device are started, the user equipment may directly initiate the screen-sharing function to the preset target device. This manner is applicable to a relatively fixed combination between a screen-sharing device and a screen-shared device, and can more quickly implement the screen-sharing connection.

Figure 3:
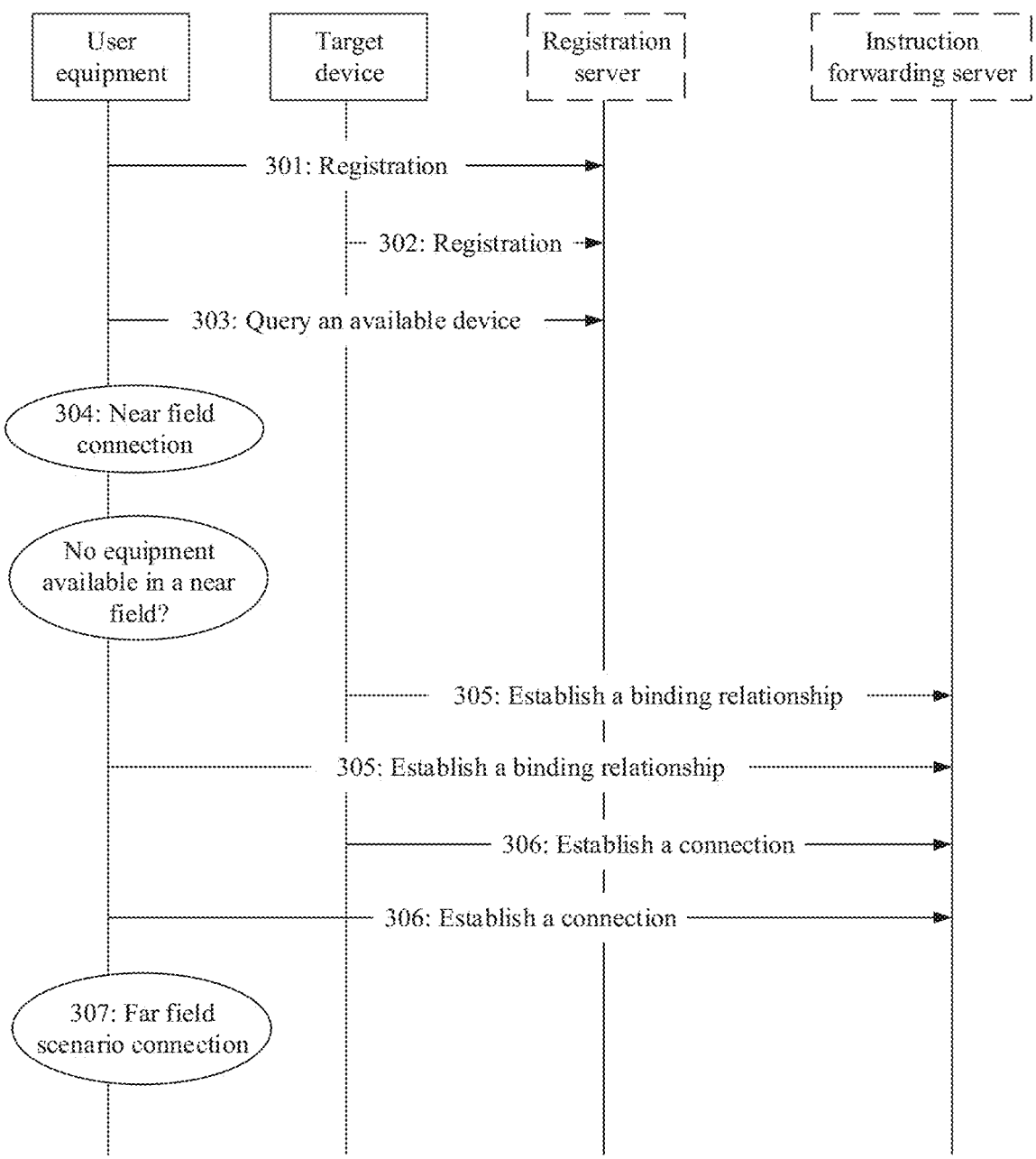
FIG. 3 is a schematic diagram of implementing communication between user equipment and a target device by using a registration and binding mechanism according to this application.

This may also be implemented through a registration or binding mechanism. Referring to FIG. 3, if the user equipment and the target device are located in the same network segment (internal network, near field scenario), the user equipment and the target device perform registration on the internal network in advance. An example in which communication between the user equipment and the target device is implemented based on a DLNA protocol is used. A registration mechanism may be as follows.

S301: User equipment, as a control end (digital media controller (DMC)), performs registration on an internal network.

S302: A target device, as a playing end (digital media player (DMP)), is registered on the internal network.

S303: Before using a screen-sharing function, the user equipment queries an available target device on the internal network. A DLNA network protocol is used as an example. The user equipment is the DMC end defined in a DLNA protocol stack, and detects whether the DMP end applicable to screen-sharing display is on the network.

S304: After finding the available target device on the internal network, the user equipment selects a near field scenario as a network transmission mode.

If the near field scenario is unavailable, the user equipment may switch the near field scenario to a far field scenario to transmit playing status information. However, before the user equipment and the screen-shared device (the target device) use the screen-sharing function in the far field scenario, a binding relationship needs to be established first, to pair the user equipment and the target device. The following uses deployment of an instruction forwarding server based on an XMPP server as an example.

S305: The user equipment and the target device need to set device IDs of the user equipment and the target device, and separately establish the binding relationship between the user equipment and the target device by using the XMPP Server, so that the user equipment and the target device can identify each other. The binding relationship may be established in advance or may be established immediately.

S306: The user equipment and the target device separately establish a connection to the instruction forwarding server. The example in which the deployment of the instruction forwarding server based on the XMPP server is used. The user equipment and the target device separately establish an XMPP connection to the XMPP server based on the device IDs of the user equipment and the target device, to ensure that an XMPP screen-sharing service is available.

S307: The user equipment selects the far field scenario as the network transmission mode to implement screen-sharing display with the target device.

The user equipment may support the connection in the near field scenario and far field scenario at the same time, to facilitate flexible selection based on a network status. By using a registration or binding mechanism, the user equipment and the target device can be discovered and connected in the near field scenario or far field scenario, and the user equipment and the target device can flexibly configure a screen-sharing relationship.

Figure 4:
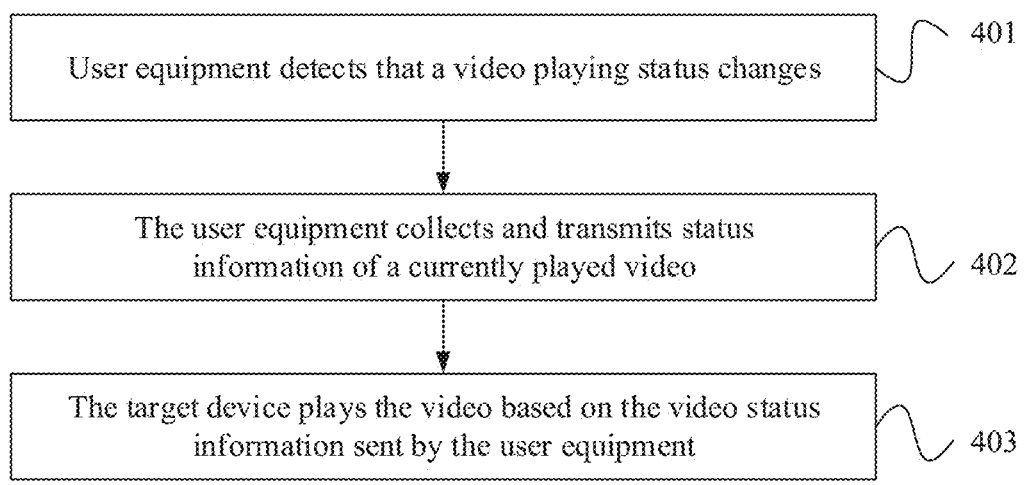
FIG. 4 is a flowchart of a method for triggering video synchronous display when a video playing status changes according to this application.

FIG. 4 shows a method for video synchronous display according to this application. There is a main difference between this embodiment and the embodiment shown in FIG. 2A. In this embodiment, a change in a video playing status triggers the user equipment to re-collect a portion or all of video playing status information and send the re-collected information to the target device. Steps are as follows.

S401: User equipment detects that a video playing status changes.

A manner of triggering the change in the video playing status may be that the user performs an operation on the user equipment to trigger the change in the video playing status. The manner of triggering the operation varies with a design of a video playing interface (for example, a VR application interface), for example, the manner of triggering the operation may be pressing, dragging, clicking, or even voice activation. The change in the video playing status may be: a pause, a progress change, a speed change (the user adjusts a playing speed), a replay, and the like. The video playing status may also be changed in a non-human manner, for example, the video is suddenly interrupted, or an advertisement is inserted in the video (except video content).

S402: The user equipment collects and transmits status information of a currently played video.

The re-collected video status information herein may be the same as or different from the video status information collected in the step S203. For example, the re-collected video status information may include only changed playing status information, for example, include only playing progress information. For a method for collecting and transmitting the video status information, refer to the steps S203 and S204. Details are not described herein again.

S403: The target device plays the video based on the video status information sent by the user equipment.

For details, refer to the foregoing step S205. Details are not described herein again. It should be noted that the target device may determine a difference between the video status information received this time and the video status information received last time (the target device buffers the video status information received last time), and perform processing only based on a parameter that changes.

In this implementation, a proper screen-sharing response can be made to various playing status changes on the user equipment, to implement a more accurate screen-sharing effect.

Figure 5:
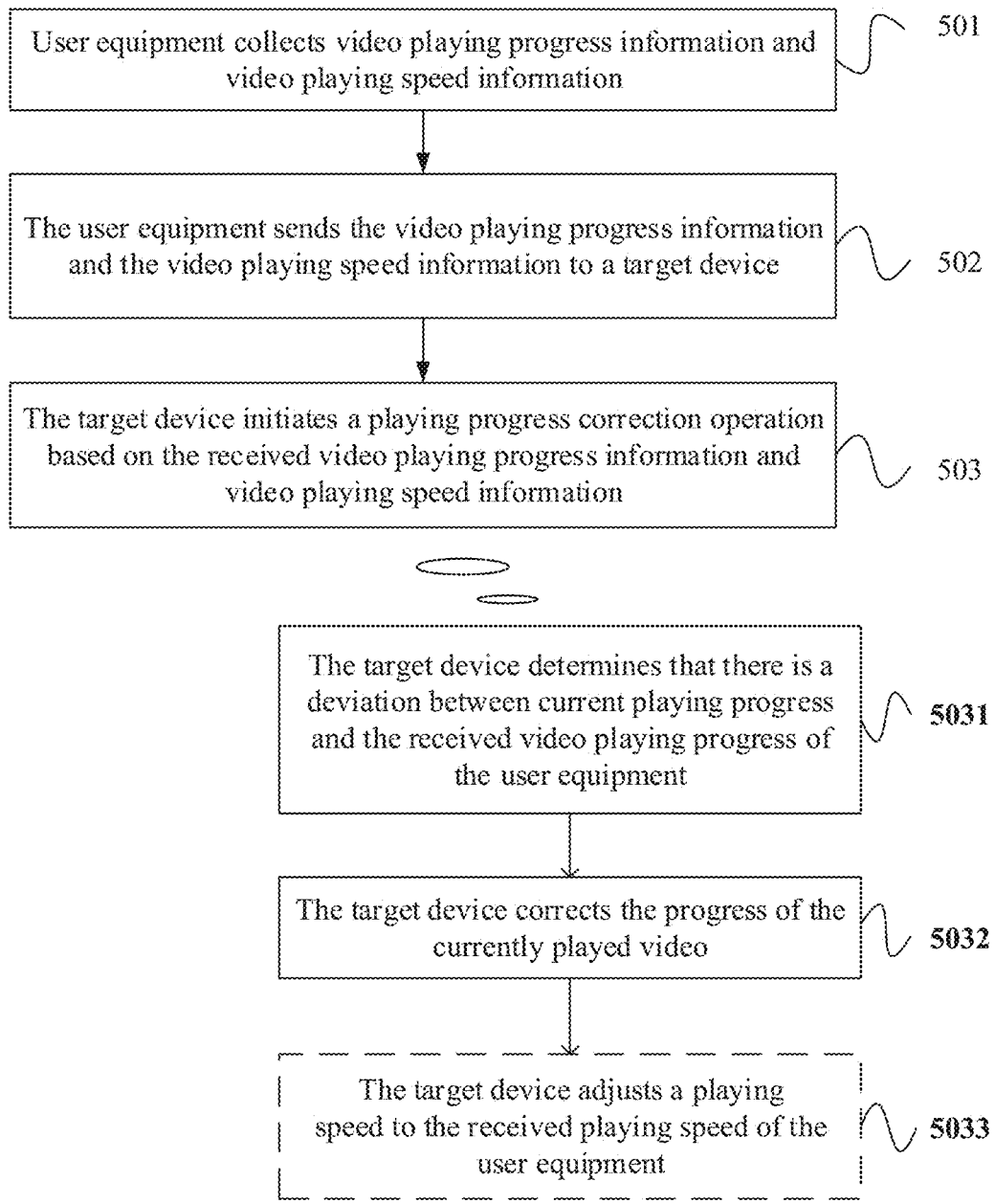
FIG. 5 is a flowchart of a playing progress correction method in a video synchronous display process according to this application.

FIG. 5 shows a method for correcting playing progress in a video synchronous display process according to this application. There is a difference between this embodiment and the embodiment shown in FIG. 2A or FIG. 4. In this embodiment, the target device may have a deviation between playing progress of the target device and current playing progress of the user equipment due to various reasons. The reason may be as follows. The user equipment does not send playing speed information to the target device after triggering synchronization with the target device, or even if the target device receives playing speed information, the target device does not perform a playing operation based on the playing speed information. Therefore, there is a subsequent playing progress deviation caused by different playing speeds. The reason may also be that the video playing status on the user equipment changes, but is not sensed by the target device. Therefore, a mechanism is required to correct inconsistent playing progress between the user equipment and the target device.

S501: User equipment collects video playing progress information and video playing speed information.

A mechanism for periodically performing a correction operation may be configured on the user equipment or the target device. For example, after video synchronization is initiated, the correction operation is triggered every one minute, to trigger collection of the progress information and the speed information (or only collection of the progress information). Alternatively, a dedicated button can be set in an interface for a user to trigger synchronization correction.

S502: The user equipment sends the video playing progress information and the video playing speed information to the target device.

After collecting the playing progress information and the playing speed information, the user equipment may further send an indication or identification information to the target device, to indicate the target device to correct the playing progress based on the playing progress information and the playing speed information.

S503: The target device initiates a playing progress correction operation based on the received video playing progress information and video playing speed information.

The target device may be configured to initiate the playing progress correction operation as long as the video playing progress information and the video playing speed information are received, or initiate the playing progress correction based on the indication or identifier information that is used for performing the playing progress correction and that is included in the received information.

The playing progress correction operation may include the following steps.

S5031: The target device determines whether there is a deviation between the current playing progress and the received video playing progress of the user equipment, for example, the target device may determine whether the deviation is greater than a preset threshold (for example, 2 seconds).

S5032: If determining that the progress has the deviation, the target device corrects the progress of the currently played video, to be specific, corrects the progress to a received video playing progress value of the user equipment.

S5033: The target device adjusts the playing speed to the received playing speed of the user equipment. Certainly, if determining that the playing speed is the same as the playing speed of the user equipment, the target device may not need to adjust the playing speed.

In the embodiments of the present disclosure, the periodic correction operation mechanism may be configured on the user equipment or the target device, to ensure accuracy of display synchronization between the user equipment and the target device.

The following describes a manner of encapsulating the video status information. In this embodiment of the present disclosure. In a near field (a DLNA network transmission mode) and a far field (an XMPP network transmission mode), the video status information may be transmitted by using a same encapsulation method. The video status information is encapsulated in the following scenarios.

In the embodiment for starting video synchronous display described in FIG. 2A, the video status information may be encapsulated by using the following instruction format, as shown in Table 1.

TABLE 1

| Parameter | Parameter description |
| --- | --- |
| functionType | Action that the screen-shared device is indicated to perform Starting video synchronous display: startPlay |
| mediaCode | Unique identifier of media |
| playByBookmark | Whether the screen-shared device is indicated to play the video from a bookmark position<br>1: yes<br>0: no |
| playByTime | Time point at which the screen-shared device is indicated to play the video from the bookmark position |
| playUrl | Uniform Resource Locator (URL) that can be directly played on the screen-shared device |
| isVR | Indicating the screen-shared device to enter a VR screen-sharing status<br>1: enter the VR status |

An example of instruction encapsulation is as follows:

{"action": "functionCall", "functionType": "startPlay", "mediaCode": "2", "playByBookMark": "1", "playByTime": "180", "playUrl": " ", "isVR": "1"}.

The following instruction encapsulation includes an indication startPlay of starting a screen-sharing operation on the target device. If the target device is configured to start the screen-sharing operation immediately after receiving media status information (mediaCode, playByBookmark, playByTime, and playUrl in Table 1), the screen-sharing operation indication may not need to be included. It can be learned from the foregoing encapsulation example that, the video status information sent by the user equipment includes the media identifier information that mediacode is 2 and the playing progress information that the playing time point is 180. It may be further learned that, if the user equipment is a VR device, for example, the user equipment may collect user posture information (for example, HMD posture information), the encapsulated media status information further includes an indication "1: Enter the VR status" that indicates the target device to enter the VR screen-sharing status. This indicates that the target device needs to perform processing such as rendering on the played video picture based on the user posture information in the video status information.

In the embodiment of the screen-sharing operation triggered by the change of the video playing status described in FIG. 3, the video status information may be encapsulated in the following instruction format, as shown in Table 2.

TABLE 2

| Parameter | Parameter description |
| --- | --- |
| functionType | Action that the screen-shared device is indicated to perform Playing status change: trickPlayControl |
| trickplayMode | Playing status at which the screen-shared device is indicated to be<br>0: play<br>1: suspended<br>2: fast-forward or rewind<br>3: seek<br>4: one-click to the beginning<br>5: one-click to the end<br>10: exit the playing |
| seekPostion | Playing position that is needed to be sought |
| fastSpeed | Fast-forward or rewind speed, which is needed only when the trick play status is 2 or 3<br>Value range: −32/−16/−8/−4/−2/2/4/8/16/32 |
| isVR | Indicating the screen-shared device to enter a VR screen-sharing status<br>1: enter the VR status |

An example of instruction encapsulation is as follows:

{"action": "functionCall", "functionType": "trickPlayControl", "trickPlayMode": 2, "fastSpeed": 8}.

It can be learned from the encapsulation example in Table 2 that, the playing status of the user equipment changes. "2: fast-forward or rewind" occurs, and the fast-forward speed is 8×.

In the embodiment of the method for correcting the playing progress in the video synchronous display process in FIG. 4, the video status information may be encapsulated in the following instruction format, as shown in Table 3.

TABLE 3

| Parameter | Parameter description |
| --- | --- |
| functionType | Action that the screen-shared device is indicated to perform Playing status change: trickPlayControl |
| trickplayMode | Playing status at which the screen-shared device is indicated to be<br>0: play<br>1: suspended<br>2: fast-forward or rewind<br>3: seek<br>4: one-click to the beginning<br>5: one-click to the end<br>10: exit the playing<br>20: synchronous HMD posture |
| seekPostion | Playing position that is needed to be sought |
| fastSpeed | Fast-forward or rewind speed, which is needed only when the trick play status is 2 or 3<br>Value range: −32/−16/−8/−4/−2/2/4/8/16/32 |
| isVR | Indicating the screen-shared device to enter a VR screen-sharing status<br>1: enter the VR status |

An example of instruction encapsulation is as follows:

{"action": "functionCall", "functionType": "trickPlayControl", "trickPlayMode": 2, 3, "seekPostion": "150", "fastSpeed": 2}.

It can be learned from the encapsulation example in Table 3 that the user equipment triggers playing progress correction. The current playing progress is 150, and the playing speed is 2× (certainly, may also be a specific speed value). After receiving the information, the target device may correspondingly correct the playing progress.

In all embodiments of the present disclosure, the user equipment may further collect the user posture data. For example, the user equipment collects HMD posture data from the VR device, and also sends the user posture data to the target device. The target device processes a corresponding video display image based on the posture data. The encapsulation of the HMD posture data may be shown in the following Table 4.

TABLE 4

| Parameter | Parameter description |
| --- | --- |
| functionType | Action that the screen-shared device is indicated to perform Playing status change: trickPlayControl |
| trickplayMode | Playing status at which the screen-shared device is indicated to be<br>20: synchronous HMD posture |
| isVR | Indicating the screen-shared device to enter a VR screen-sharing status<br>1: enter the VR status |
| Quaternion | HMD head mounted posture data, which is valid when trickplayMode is 20<br>Value format: x, y, z, w |

An example of instruction encapsulation is as follows:

{"action": "functionCall", "functionType": "trickPlayControl", "trickPlayMode": 20, isVR, "1", "quaternion": "0, 0, 0, 1"}.

It can be learned from the encapsulation example in Table 4 that the user equipment collects user posture information (for example, HMD information). The encapsulated media status information includes an indication for indicating the target device to enter the VR screen-sharing status (certainly, if the target device is already in the VR status by default, no special indication is required), and further includes a specific four-tuple value of the HMD posture data: "0, 0, 0, 1".

Table 1-Table 4 describes an encapsulation form or format of the video status information from perspectives of different embodiments. It may be understood that, during actual encapsulation, meanings, names, and quantities of specific parameters in Table 1-Table 4 may be adjusted based on an actual requirement. For example, only some parameters may be encapsulated, a collection of all parameters in Table 1-Table 4 may be encapsulated, or more parameters may be encapsulated. A plurality of parameters may also be bound through encapsulation, for example, the posture data is bound to the playing progress, to ensure accuracy of the posture synchronization image.

The foregoing mainly describes the solutions provided in the embodiments of this application from a perspective of interaction between the user equipment and the target device. It may be understood that to implement the foregoing functions, the user equipment and the target device include corresponding hardware structures and/or software modules for performing the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the user equipment and the target device may be divided into functional modules based on the foregoing method embodiments. For example, each functional module may be obtained through division based on each corresponding function, or two or more functions may be integrated into one processing module. The integrated module may be implemented in a form of hardware, or may be implemented in a form of a software functional module. It should be noted that, in this embodiment of this application, division into the modules is an example, and is merely a logical function division. In actual implementation, another division manner may be used. The following uses an example in which each functional module is obtained through division based on each corresponding function for description.

Figure 6:
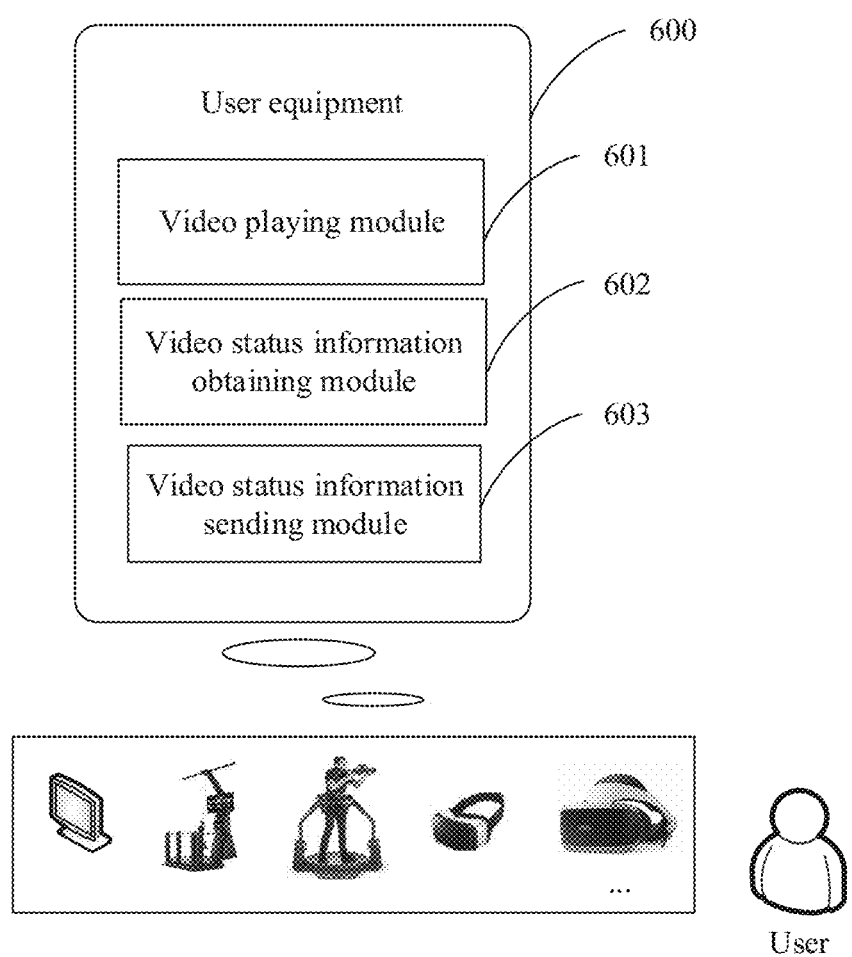
FIG. 6 is a possible schematic structural diagram of user equipment according to this application.

FIG. 6 is a possible schematic structural diagram of the user equipment 600 in the foregoing embodiment. The user equipment 600 includes a video playing module 601, a video status information obtaining module 602, and a video status information sending module 603.

The video playing module 601 is configured to play a first video. The video status information obtaining module 602 is configured to obtain status information of the first video after receiving an indication of starting synchronous display with a target device, where the video status information is used for the target device and the user equipment to synchronously play an image of the first video. The video status information sending module 603 is configured to send the obtained video status information to the target device, so that the target device synchronously plays the image of the first video based on the video status information.

Optionally, the video status information includes video identification information and video playing progress information.

Optionally, the video status information further includes user posture data.

Optionally, that the video status information sending module is configured to send the video status information to the target device further includes that the video status information sending module is configured to perform suppression calculation on the user posture data, and send the user posture data based on a suppression calculation result.

Optionally, the video status information sending module selects, based on a network connection manner between the user equipment and the target device, a near field manner or a far field manner to send the video status information to the target device.

Optionally, the video status information sending module is further configured to encapsulate the video status information and send the encapsulated video status information to the target device.

Optionally, the video status information obtaining module is further configured to, when detecting that the video play status changes, re-obtain the video status information of the first video, and send the re-obtained video status information to the target device.

Optionally, the video status information obtaining module is further configured to, when detecting a playing progress synchronization instruction or a playing progress correction instruction, collect video playing progress information and video playing speed information, send the video playing progress information and the video playing speed information to the target device.

Figure 7:
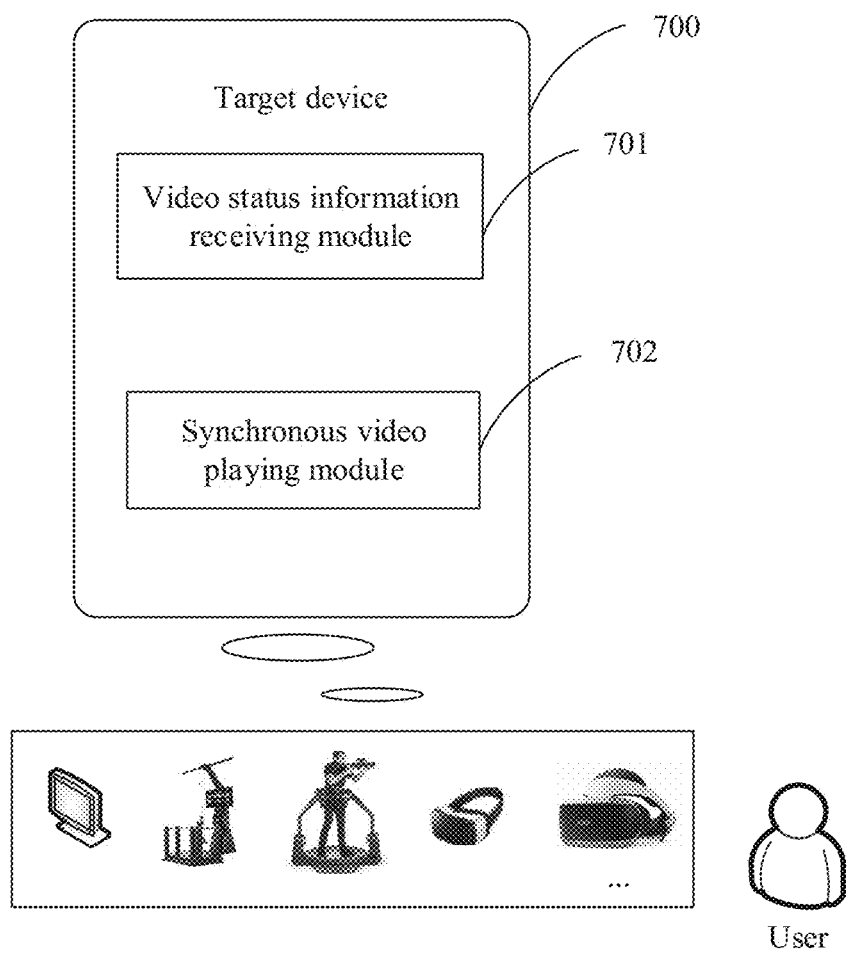
FIG. 7 is a possible schematic structural diagram of a target device according to this application.

FIG. 7 is a possible schematic structural diagram of a target device 700 in the foregoing embodiments. The target device 700 includes a video status information receiving module 701 and a synchronous video playing module 702. The video status information receiving module 701 is configured to receive status information that is of a first video and that is sent by user equipment. The status information of the first video is status information that is collected by the user equipment and that is of the first video being played on the user equipment. The synchronous video playing module 702 is configured to synchronously play an image of the first video on the target device based on the video status information.

Optionally, the video status information includes video identification information and video playing progress information. The synchronous video playing module 702 is further configured to find a first video file based on the video identification information, locate a corresponding playing position based on the video playing progress information, and play the first video file.

Optionally, the video status information further includes user posture data, and the synchronous video playing module 702 is further configured to restore, based on the user posture data, the image of the first video at the corresponding position.

All related content in all the foregoing embodiments may be referenced to function descriptions of functional modules corresponding to the user equipment and the target device. Details are not described herein again. Because the user equipment and the target device provided in the embodiments of this application are configured to perform the methods in all the foregoing embodiments, for technical effects that can be achieved by the user equipment and the target device, refer to the foregoing method embodiments. Details are not described herein again.

The "module" in FIG. 6 and FIG. 7 may be an application-specific integrated circuit (ASIC), an electronic circuit, a processor that executes one or more software or firmware programs, a memory, a combinational logic circuit, and another component that provides the foregoing functions. When the integrated unit or module is implemented in the form of a software functional unit and sold or used as an independent product, the integrated unit may be stored in a computer-readable storage medium.

Figure 8:
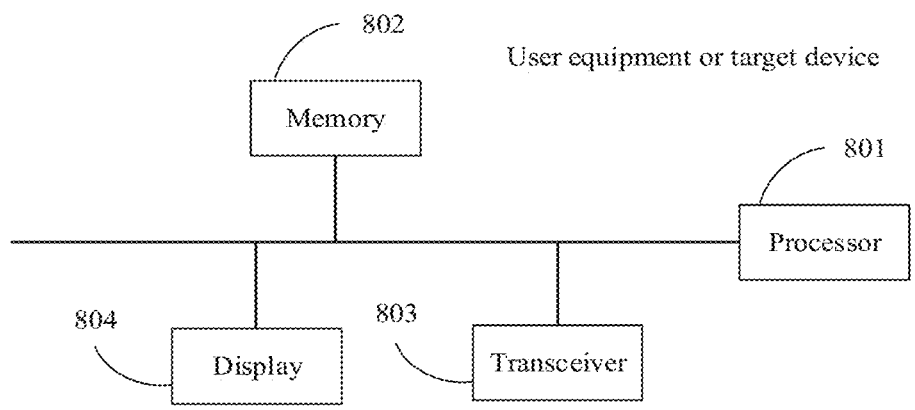
FIG. 8 is a possible schematic structural diagram of user equipment or a target device according to this application.

FIG. 8 is another schematic structural diagram of user equipment or target device according to an embodiment of this application. The structure includes a processor 801, a memory 802, a transceiver 803, and a display 804. The processor 801 is connected to the memory 802 and the transceiver 803. For example, the processor 801 may be connected to the memory 802 and the transceiver 803 by using a bus.

The processor 801 may be configured to perform a corresponding function in the foregoing embodiment by the user equipment, or may be configured to support the target device in performing a corresponding function in the foregoing embodiment. The processor 801 may be a central processing unit (CPU), a network processor (NP), a hardware chip, or any combination thereof. The hardware chip may be an ASIC, a programmable logic device (PLD), or a combination thereof. The PLD may be a complex PLD (CPLD), a field-programmable gate array (FPGA), a generic array logic (GAL), or any combination thereof.

The memory 802 is configured to store program code and the like. The memory 802 may include a volatile memory, for example, a random-access memory (RAM). The memory 502 may also include a nonvolatile memory, for example, a read-only memory (ROM), a flash memory, a hard disk drive (HDD), or a solid-state drive (SSD). The memory 802 may further include a combination of memories of the foregoing types.

The transceiver 803 may be a communications module or a transceiver circuit, and is configured to transmit information such as data and signaling between the user equipment and the target device, or between the user equipment and the target device and another network unit such as a video server in the foregoing embodiments.

The processor 801 may invoke the program code to perform operations in the method embodiments shown in FIG. 2A to FIG. 5.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present disclosure are all or partially generated. The computer may be a general-purpose computer, a dedicated computer, a computer network, or other programmable apparatuses. The computer instruction may be stored in a computer-readable storage medium, or may be transmitted by using the computer-readable storage medium. The computer instructions may be transmitted from a website, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any available medium accessible to the computer. For example, the computer instruction may be stored or transmitted by using a magnetic medium (for example, a floppy disk, a hard disk, or a magnetic tape), an optical medium (for example, a DIGITAL VERSATILE DISC (DVD)), or a semiconductor medium (for example, a solid-state disk (SSD)).

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for video synchronous display implemented by a user equipment, wherein the method comprises:
    playing a first video;
    receiving a synchronous display indication of starting synchronous display with a target device while playing the first video;
    obtaining, in response to the synchronous display indication, first video status information of the first video, wherein the first video status information comprises user posture data;
    performing suppression calculation on the user posture data to obtain a suppression calculation result;
    sending, based on the suppression calculation result, the first video status information to the target device to prompt the target device to synchronously play an image of the first video based on the first video status information; and
    synchronously playing, using the first video status information, the image with the target device.

2. The method of claim 1, wherein the first video status information further comprises video identification information and video playing progress information.

3. The method of claim 1, further comprising selecting, based on a network connection manner between the user equipment and the target device, a near field manner or a far field manner to send the first video status information to the target device.

4. The method of claim 1, further comprising:
    detecting that a video playing status of the user equipment has changed;
    obtaining, in response to detecting that the video playing status has changed, second video status information of the first video; and
    sending the second video status information to the target device.

5. The method of claim 1, further comprising:
    detecting a playing progress synchronization instruction or a playing progress correction instruction; and
    in response to detecting the playing progress synchronization instruction or the playing progress correction instruction:
        collecting video playing progress information of the first video and video playing speed information of the first video; and
        sending the video playing progress information and the video playing speed information to the target device.

6. A first user equipment comprising:
    a memory configured to store instructions; and
    a processor coupled to the memory, wherein the instructions cause the processor to be configured to:
        play a first video;
        receive a synchronous display indication of starting synchronous display with a target device while playing the first video;
        obtain, in response to the synchronous display indication, first video status information of the first video, wherein the first video status information comprises user posture data;
        perform suppression calculation on the user posture data to obtain a suppression calculation result;
        send, based on the suppression calculation result, the first video status information to the target device to prompt the target device to synchronously play a first image of the first video based on the first video status information; and
        synchronously play, using the first video status information, the first image with the target device.

7. The first user equipment of claim 6, wherein the instructions further cause the processor to be configured to:
    perform suppression calculation on the user posture data to obtain a suppression calculation result; and
    send, based on the suppression calculation result, the user posture data to the target device.

8. The first user equipment of claim 6, wherein the instructions further cause the processor to be configured to select, based on a network connection manner between the first user equipment and the target device, a near field manner or a far field manner to send the first video status information to the target device.

9. The first user equipment of claim 6, wherein the instructions further cause the processor to be configured to:
    detect that a video playing status of the user equipment has changed;
    obtain, in response to detecting that the video playing status has changed, second video status information of the first video; and
    send the second video status information to the target device.

10. The first user equipment of claim 6, wherein the instructions further cause the processor to be configured to:
    detect a playing progress synchronization instruction or a playing progress correction instruction; and
    in response to detecting the playing progress synchronization instruction or the playing progress correction instruction:
        collect video playing progress information of the first video and video playing speed information of the first video; and
        send the video playing progress information and the video playing speed information to the target device.

11. The first user equipment of claim 6, wherein the instructions further cause the processor to be configured to:
    receive, from a second user equipment, third video status information of a second video, wherein the second video is being played on the second user equipment; and
    synchronously play a second image of the second video based on the third video status information.

12. A computer program product comprising computer-executable instructions stored on a non-transitory computer-readable storage medium that, when executed by a processor, cause a user equipment to:
    play a first video;

receive a synchronous display indication of starting synchronous display with a target device while playing the first video;

obtain, in response to the synchronous display indication, first video status information of the first video, wherein the first video status information comprises user posture data;

perform suppression calculation on the user posture data to obtain a suppression calculation result;

send, based on the suppression calculation result, the first video status information to the target device to prompt the target device to synchronously play an image of the first video based on the first video status information; and synchronously play, using the first video status information, the image with the target device.

13. The computer program product of claim 12, wherein the first video status information further comprises video identification information and video playing progress information.

14. The computer program product of claim 12, wherein the computer-executable instructions further cause the user equipment to:

perform suppression calculation on the user posture data to obtain a suppression calculation result; and send, based on the suppression calculation result, the user posture data to the target device.

15. The computer program product of claim 12, wherein the computer-executable instructions further cause the user equipment to select, based on a network connection manner between the user equipment and the target device, a near field manner or a far field manner to send the first video status information to the target device.

16. The method of claim 2, wherein the video identification information indicates, to the target device, a video file corresponding to the first video, and wherein the video playing progress information locates, at the target device, a playing position corresponding to the first video.

17. The method of claim 1, wherein performing the suppression calculation on the user posture data comprises calculating a three-dimensional spatial included angle formed by postures of the user at two consecutive time points.

18. The method of claim 17, wherein sending, based on the suppression calculation result, the user posture data comprises sending, when the included angle is greater than a threshold, the user posture data to the target device.

19. The method of claim 1, wherein the method is implemented by the user equipment that comprises a head-mounted display (HMD), wherein the user posture data is HMD posture data of the user and comprises one or more viewing angles of a head of the user.

20. The method of claim 19, wherein the suppression calculation comprises an HMD posture synchronization suppression algorithm.

\* \* \* \* \*